Jan. 7, 1936.  E. G. STRECKFUSS  2,026,918
GUARDED JUICE EXTRACTING MACHINE
Filed Jan. 20, 1933  2 Sheets-Sheet 1
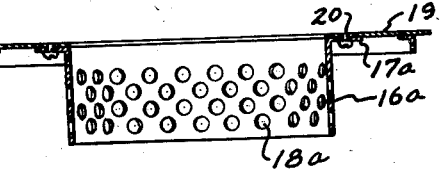
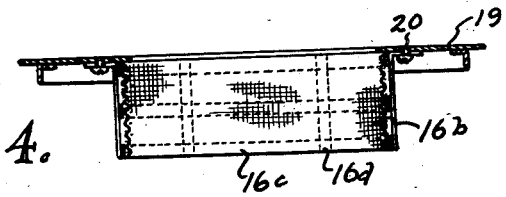
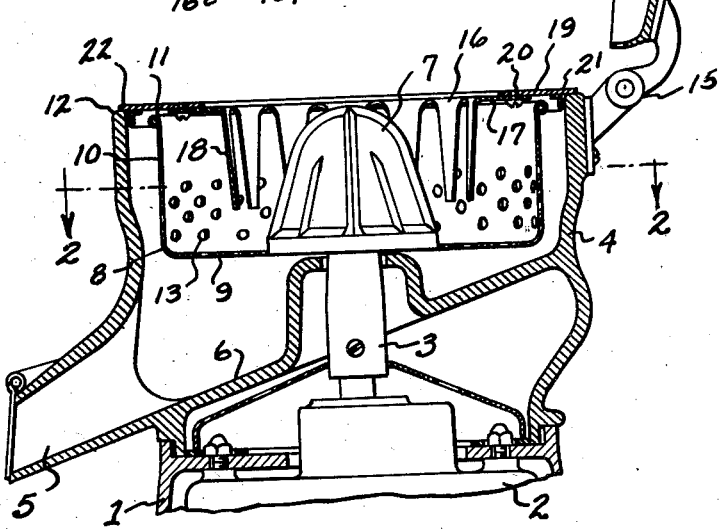
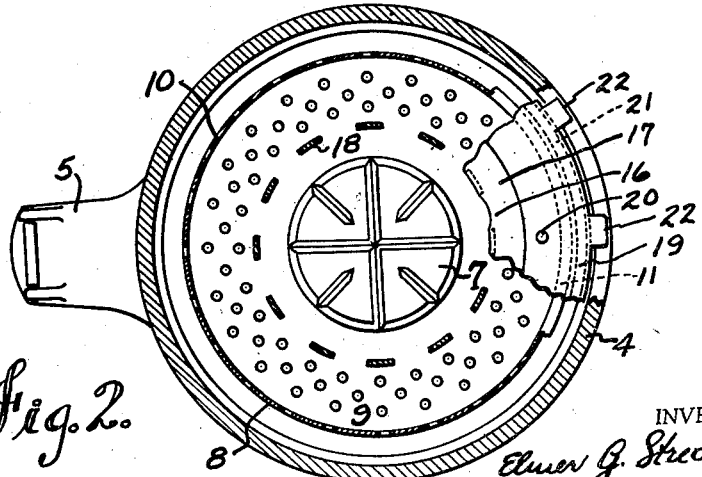
INVENTOR.
Elmer G. Streckfuss
BY Allen & Allen
ATTORNEYS Jan. 7, 1936.      E. G. STRECKFUSS      2,026,918
GUARDED JUICE EXTRACTING MACHINE
Filed Jan. 20, 1933      2 Sheets-Sheet 2

INVENTOR.
Elmer G. Streckfuss
BY Allen & Allen
ATTORNEYS

Patented Jan. 7, 1936

2,026,918

UNITED STATES PATENT OFFICE 2,026,918

GUARDED JUICE EXTRACTING MACHINE

Elmer G. Streckfuss, Cincinnati, Ohio, assignor to The Cincinnati Time Recorder Company, Cincinnati, Ohio, a corporation of Ohio Application January 20, 1933, Serial No. 652,716

13 Claims. (Cl. 146—3)

My invention relates to fruit juice extracting devices in which the juice is extracted from pieces of fruit by pressure thereof against a bulb, grating member, or reamer, while the latter is rotated rapidly. It is applicable to machines of the character in which the machine also has a strainer rotating with the reamer, through which the extracted juice is discharged. It also is applicable to such machines which are not provided with strainers. Either kind of machine has a bowl surrounding the reamer to a greater or less extent.

Where there is no strainer, a piece of fruit thus escaping the grasp of the operator, becoming unbalanced on the rotating reamer, is thrown violently against the side of the bowl and down into the space between the reamer and side of the bowl. In attempting to recover the piece, it frequently happens that the operator has the skin of the hand or wrist torn by contact with the reamer.

Where the strainer is used, the piece is lodged against a wall of the strainer, unbalancing the machine and causing the entire machine to move along the table or counter, with possibility of falling therefrom, distorting the strainer, if the latter is made of thin sheet metal; and when thus carried around with the wall of the rapidly rotating strainer, the piece of fruit may be thrown violently upward and out of the bowl, with possible injury to the operator or other persons, or surrounding objects.

The object of my invention is to prevent such displacement of a piece of fruit escaping from the operator's hand, limiting the displacement to such degree that no dangerous amount of centrifugal force may be exerted on the piece of friut.

A further object is to guard against the displacement of the piece of fruit without interfering materially with the flow of juice outward and downward from the reamer.

A further object is to provide a guard for the purpose, in such a way that it is readily detachable from other parts of the machine, for convenience of cleaning the guard and other parts.

A further object is to combine with the guard, especially in a machine with a strainer rotating with the reamer, means for preventing escape of juice, seeds and the like from the strainer, and preferably to provide the latter means as a support for the guard in its detachable relation to the machine.

Other objects will appear in the course of the following description, illustrated by the accompanying drawings, in which:

Figure 1 is a vertical axial section of a juice extracting machine in which the strainer rotates with the reamer, embodying my invention.

Figure 2 is a horizontal cross section of the same on the line 2—2 of Figure 1.

Figure 3 is a detail sectional view corresponding to the section of Figure 1, showing a modified guard for the machine of Figure 1.

Figure 4 is a similar view showing a second modified guard for said machine.

Figure 5:
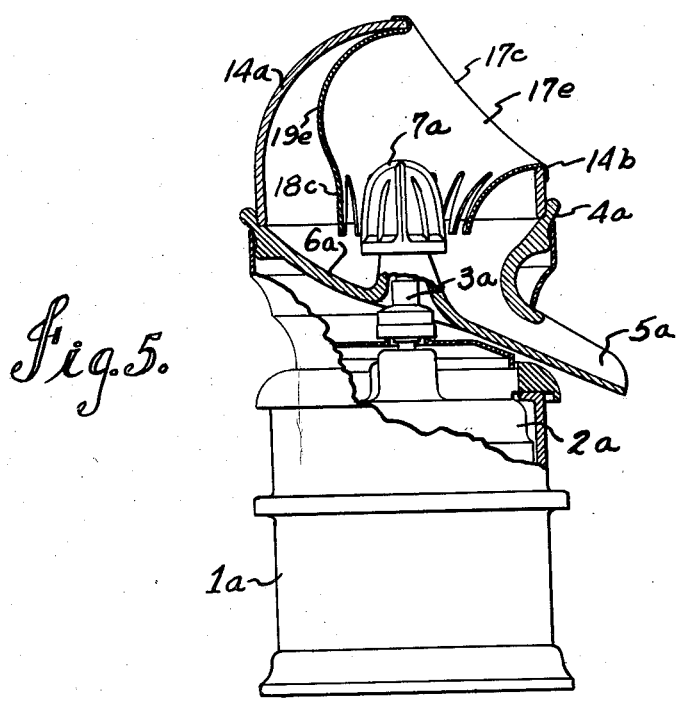
Figure 5 is a vertical axial section of a juice extracting machine of well known type in which there is no strainer, and in which the bowl has an upper part or section extending over the reamer, with a side opening for insertion of the fruit onto the reamer, embodying my invention.

In the example of Figures 1 to 4, inclusive, my invention is embodied in a machine such as is fully disclosed and claimed in my co-pending application Serial No. 651,915, filed January 16, 1933. This machine comprises a base or pedestal 1, a motor 2 supported therein on an upright axis, with a shaft 3 extending upward through the bottom of the bowl 4, which is supported on top of the pedestal 1 and has a lateral spout 5 leading from its sloping bottom 6. Mounted on the upper end of the motor shaft 3 to turn therewith, is the reamer and strainer unit, comprising the central bulb or reamer 7 of approximately conical shape, and the cup-shaped strainer 8 with a flat bottom 9 unitary with and extending outward from the bottom of the reamer 7, and vertical cylindrical walls 10 having their rim 11 in a horizontal plane slightly below the horizontal plane of the rim 12 of the bowl 4. The lower part of the strainer walls 10 and the adjacent annular area of the bottom 9 of the strainer have perforations 13. This strainer strains the juice coming from the reamer 7, and also acts centrifugally, especially in its outer regions, to promote the outflow of the juice. The bowl has a lid 14 with a hinge 15 at one side, on which it is swung to open position as shown, when the machine is being used. This lid 14 is so mounted that it leaves a space over the bowl rim 12 when closed.

My improvement comprises the annular guard 16, comprising a top flat rim portion 17 and downwardly tapering prongs 18 depending at intervals from the inner edge of the rim portion. These prongs 18 terminate some distance from the bottom 9 of the strainer, and preferably slightly converge in their downward extent. These prongs 18 are arranged in a circle concentric with the reamer 7, and at such spacing therefrom as to leave ample annular space therearound, into which pieces of fruit of a given range of sizes may be conveniently inserted over the reamer 7, with sufficient room for the hand which grasps the fruit. As the piece of fruit ordinarily is a half of an approximately spherical fruit, such as an orange, grape fruit, lemon, lime, or the like, the curvature of the fruit allows space for the fingers and thumb grasping the fruit, at the top of the guard, while the lower rim of the half of the fruit will lie much closer to the lower portions of the prongs 18. The convergence of the prongs downwardly additionally contributes to this effect.

The rim portion 17 has its outer peripheral part underlying the annular inner edge portion of the flat retaining ring 19, to which it is fastened by screws 20. This ring 19 acts to prevent splashing of juice and escape of seeds and the like out over the rim of the strainer 8 under the centrifugal action thereof. It has a depending annular flange 21 fitting inside the bowl rim 12 and acting as a barrier to passage of unstrained juice and seeds down between the bowl and strainer rims. It also has radial lugs 22 at intervals, resting upon the bowl rim 12, supporting the ring 19 and the guard 16. The construction and arrangement of the ring 19 as just described, is fully disclosed and claimed in my co-pending application above mentioned. It will be seen that in my present invention this ring performs the additional function of supporting the guard 16. The flange 21 coacts with the bowl rim 12 to center the guard relative to the reamer 7.

It will be understood that the guard 16 and ring 19 may be integrally formed. However, I prefer to have the guard and ring detachably connected, as by the screws 20 as shown, so that guards of different diameters may be substituted for use with fruits of different sizes. For instance, a larger guard may be provided for use with large grape fruits, another for smaller grape fruits and large oranges, and a third smaller one for use with small oranges, lemons and limes. It is not necessary for diameter of the guard to very closely approximate the diameter of the fruit, however, and guards of two sizes may serve for all of the different sized fruits above instanced.

Even if the fruit is of considerably less diameter than the guard, it cannot be displaced so far as to dangerously unbalance the machine or as to acquire such centrifugal force as to be fully displaced from the reamer. I find that in case the fruit is released from the hand, it merely slowly revolves within the guard 16 by its light bearing on the reamer 7, partly following the reamer and partly retarded by the guard. It is thus readily regrasped by the operator with no danger to the latter. The improvement not only is a safety appliance, but adds to the efficiency of the machine and operator by relieving the operator of fear of injury and leaving the fruit immediately available to the operator in case of chance release by the latter.

The prongs 18, spaced apart as they are, leave ample space for exit of the juice. The termination of the prongs amply far from the bottom 9 of the strainer also permits the free passage of the juice outward in the strainer, under the centrifugal action, which is most effective along the strainer bottom 9 upon the juice escaping from the fruit at the base of the reamer 7. The tapering of the prongs 18, from ample junction width at the rim portion 17 to their lower ends, adds to the width of inter-prong juice exit spaces without weakening the guard structure. The prongs 18 may, if desired, have considerable resilience, springing out for occasional extra large fruits.

My machine is especially adapted for disassembly of its parts, as the reamer and strainer from the shaft, as set forth and claimed in my co-pending application in which the retaining ring 19 is also readily removable from the bowl. By mounting the guard 16 on this ring, it is readily removed therewith. Thus, the machine, including the guard, is readily cleaned and kept in sanitary condition.

In Figure 3 I have shown my guard of modified construction, comprising a shallow cylindrical shell 16a with the upper flat rim portion 17a detachably secured by the screws 20 to the retaining ring 19 as in the first example. The shell 16a has fairly large perforations 18a substantially throughout its area, for the passage of the juice, corresponding to the spaces between the prongs 18 in the first example. It will be understood that this guard would fit in the machine of Figure 1 with its lower rim spaced up from the strainer bottom 9 as the lower ends of the prongs 18 are in that example, so that full space for exit of juice is afforded.

In the second modification of Figure 4, the guard comprises a cylindrical shell 16b of woven wire netting or like foraminous material, supported on a light framework of circumferential rings 16c and vertical bars 16d; the upper ends of the latter being detachably secured to the retaining ring 19 by the screws 20. This guard would fit in the machine of Figure 1 with its lower rim spaced up from the strainer bottom. The frame elements 16c and 16d are preferably on the outer side of the foraminous shell 16b, leaving the latter substantially smooth interiorly where contacted by the fruit during the guarding action.

In Figure 5 I have shown a machine of a type different from my machine of Figure 1, in which the pedestal 1a containing and supporting the motor 2a, with upstanding shaft 3a, supports on its top the bowl 4a having a lower lateral spout 5a to which its bottom 6a slopes. The reamer 7a is mounted on the upper end of the motor shaft 3a to turn therewith, and instead of a lid, the bowl has an upper part 14a of dome shape, with an upwardly and outwardly presented access opening 14b at one side. This type of machine is well known in the art, the fruit being thrust in onto the reamer 7a through opening 14b and held thereon by the hand. Such machines have not been provided with rotary strainers, but difficulty arises when the fruit escapes from the operator's grasp, in that the fruit is forced, under the centrifugal action due to the unbalanced position it assumes on the reamer, out to the side of the bowl and its upper part or dome 14a, whence it rebounds down between the reamer and bowl walls, making it dangerous for the operator to recover it while the machine is running, as before alluded to. Of course, the fruit may be safely recovered if the machine is stopped, but the operator cannot be relied upon to do this, and is apt to take the risk of injury to save time.

I provide my guard for this type of machine so as to prevent this disposition of escaping fruit pieces, and thereby remove all danger of injury to the operators.

The principle of operation of my guard in this machine is the same as in the first example, the construction being modified only in accordance with the different construction of the upper parts of the machine. The guard 16e comprises the upper portion 17e with the prongs 18c depending from its lower annular rim, in the same relation to the reamer as is had by the prongs 18 of Figure 1. The upper portion 17e flares upwardly, and curves laterally and upward, its upper outer rim 17c being flanged to fit around the edges of the access opening 14b, in which the portion 17e fits. The inner or rear side 19e of this portion 17e is bulged inwardly or rearwardly, so that ample space is left for the hand in application of the fruit to the reamer. The action of the guard will be apparent in view of the previous description as to Figure 1.

Figure 6:
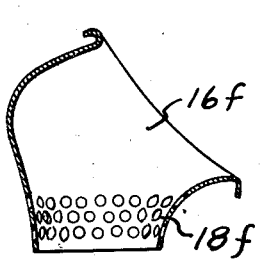
Figure 6 is a detail sectional view corresponding to the section of Figure 5, showing a modified guard for the machine of Figure 5.
Figure 7:
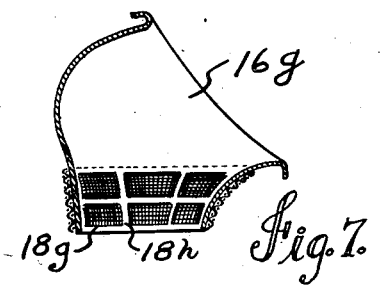
Figure 7 is a similar view showing a second modified guard for said machine.

In Figure 6, the guard 16f is similar to that of Figure 5, but has the lower portion provided with perforations 18f instead of being pronged, corresponding to the perforated shell guard of Figure 3 in the first machine. In Figure 7, the lower portion of the guard 16g is formed as a framework 18h, supporting netting 18g, corresponding to the guard of Figure 4 in the first machine. It is understood that either modified guard, of Figure 6 or Figure 7, will fit in the machine of Figure 5 as described for the guard 16e therein.

In either the machine of Figure 1 or that of Figure 5, without my guard, the fruit escaping the grasp of the operator may fly out of the machine anywhere on the bowl rim of Figure 1, or through the access opening 14b of Figure 5, striking the operator or others, or surrounding objects. My guard in either machine effectively precludes such an accident.

Other modifications may occur, and I am not limited to the precise disclosure herein, but what I claim as new and desire to secure by Letters Patent, is:—

1. In a juice extracting machine comprising a bowl, a rotatable reamer in said bowl, and a guard surrounding said reamer relatively to which the reamer is rotatable, admitting the fruit to the reamer to be held thereto by the hand of the operator and adapted to prevent the fruit from becoming substantially displaced from said reamer toward the side of the bowl if the fruit escapes from the hand, said guard comprising an upper rim and prongs depending from said rim.

2. In a juice extracting machine comprising a bowl, a rotatable reamer in said bowl, and a guard surrounding said reamer relatively to which the reamer is rotatable, admitting the fruit to the reamer to be held thereto by the hand of the operator and adapted to prevent the fruit from becoming substantially displaced from said reamer toward the side of the bowl if the fruit escapes from the hand, said guard comprising an upper rim and prongs depending from said rim and terminating short of the bottom of the bowl.

3. In a juice extracting machine comprising a bowl, a rotatable reamer and a cup-shaped strainer surrounding and rotating with said reamer, a guard relatively to which the reamer is rotatable, surrounding said reamer inside said strainer for the purposes set forth.

4. In a juice extracting machine comprising a bowl, a rotatable reamer and a cup-shaped strainer surrounding and rotating with said reamer, a guard relatively to which the reamer is rotatable, surrounding said reamer inside said strainer for the purposes set forth, said guard comprising an upper rim and prongs depending from said rim and terminating short of the bottom of said strainer.

5. In a juice extracting machine comprising a bowl, a rotatable reamer and a cup-shaped strainer surrounding and rotating with said reamer, a guard relatively to which said reamer is rotatable, surrounding said reamer inside said strainer for the purposes set forth, and a support for said guard supported on the rim of said bowl.

6. In a juice extracting machine comprising a bowl, a rotatable reamer and a cup-shaped strainer surrounding and rotating with said reamer, a guard relatively to which said reamer is rotatable, surrounding said reamer inside said strainer for the purposes set forth, said guard comprising an upper rim and prongs depending from said rim and terminating short of the bottom of said strainer, and a supporting ring attached to said rim and supported by the rim of said bowl.

7. In a juice extracting machine comprising a bowl, a rotatable reamer and a cup-shaped strainer surrounding and rotating with said reamer, a guard relatively to which said reamer is rotatable, surrounding said reamer inside said strainer for the purposes set forth, said guard having an upper rim, and an annular extension on said rim, extending across the rim of said strainer and supported on the rim of said bowl and preventing escape of juice from the rim of said strainer over the rim of the bowl.

8. In a juice extracting machine comprising a bowl, a rotatable reamer and a cup-shaped strainer surrounding and rotating with said reamer, a guard relatively to which said reamer is rotatable, surrounding said reamer inside said strainer for the purposes set forth, said guard having an upper rim, and an annular extension on said rim, extending across the rim of said strainer and supported on the rim of said bowl and preventing escape of juice from the rim of said strainer over the rim of the bowl, said annular extension being detachable from said bowl rim for ready removal of said guard from the machine.

9. In a juice extracting machine comprising a rotatable reamer and a bowl surrounding said reamer and extending thereabove and having a side opening in its upper part, a guard relatively to which said reamer is rotatable, surrounding said reamer inside said bowl and having an upper laterally curved extension opening to said side opening of said bowl.

10. In a juice extracting machine comprising a rotatable reamer and a bowl surrounding said reamer and extending thereabove and having a side opening in its upper part, a guard relatively to which said reamer is rotatable, surrounding said reamer inside said bowl and having an upper laterally curved extension fitting in said side opening of said bowl and supported by the edges of said opening.

11. In a juice extracting machine comprising a rotatable reamer and a bowl surrounding said reamer and extending thereabove and having a side opening in its upper part, a guard relatively to which said reamer is rotatable, comprising a lower part surrounding said reamer and having openings therethrough, and an upper part laterally curved and opening to said side opening of said bowl.

12. In a juice extracting machine comprising a rotatable reamer and a bowl surrounding said reamer and extending thereabove and having a side opening in its upper part, a guard relatively to which said reamer is rotatable, comprising an upper part opening to said side opening of said bowl and curving downwardly and inwardly, with its lower end formed as a series of prongs depending around said reamer and terminating short of the bottom of the bowl.

13. In a juice extracting machine comprising a bowl, a rotatable reamer in said bowl, and a guard surrounding said reamer relatively to which the reamer is rotatable, admitting the fruit to the reamer to be held thereto by the operator and adapted to prevent the fruit from becoming substantially displaced from said reamer toward the side of the bowl, said guard comprising an upper rim supported on said bowl and a cylindrical member depending from said rim, surrounding said reamer, and terminating short of the bottom of the bowl.

ELMER G. STRECKFUSS.